United States Patent Office 2,849,477
Patented Aug. 26, 1958

2,849,477

PREPARATION OF α-ACYLAMINO-NITRILES

Alfred Dornow and Siegfried Lüpfert, Hannover, Germany

No Drawing. Application June 6, 1957
Serial No. 663,869

Claims priority, application Germany June 12, 1956

8 Claims. (Cl. 260—465)

The invention provides a novel process for preparing α-acylamino-nitriles. More particularly, the invention concerns a process which comprises reacting an α-keto-nitrile with an imine, a Schiff base or a hydrazone.

α-Keto-nitriles which can be used according to the invention include alkanoyl cyanides, such as acetyl cyanide, propionyl cyanide; aryloyl cyanides, such as benzoyl cyanide, toluoyl cyanide. Suitable imines, Schiff bases and hydrazones are those which may be formed by reacting ammonia, a primary aliphatic, araliphatic or aromatic amine, such as methylamine, ethylamine, propylamine, isopropylamine, butylamine, benzylamine, phenethylamine, aniline, toluidine, hydrazine, mono-substituted and disubstituted asymmetric aliphatic, araliphatic and aromic hydrazines, such as methyl-hydrazine, 1,1-dimethyl-hydrazine, ethyl-hydrazine, 1-ethyl-1-methyl-hydrazine, 1,1-diethyl-hydrazine, benzyl-hydrazine, phenethyl-hydrazine, 1-ethyl-1-benzyl-hydrazine, 1-methyl-1-benzyl-hydrazine, phenyl-hydrazine, tolyl-hydrazine, 1-phenyl-1-methyl-hydrazine, 1-phenyl-1-ethyl-hydrazine, according to methods known in the art with an aliphatic, cycloaliphatic, olefinic, araliphatic or aromatic aldehyde, e. g. with formaldehyde, acetaldehyde, propionaldehyde, cyclohexylidene-acetaldehyde, cyclohexyl-acetaldehyde, benzaldehyde, anisic aldehyde, veratric aldehyde, phenylacetaldehyde, cinnamic aldehyde; with an aliphatic, cycloaliphatic, olefinic, araliphatic or aromatic ketone, e. g. with acetone, methylvinylketone, diethylketone, cyclohexanone, cyclohexenone, acetophenone, propiophenone, benzophenone, fluorenone, xanthone, which compounds may carry substituents inert under the conditions of reaction, such as esterified or etherified hydroxy groups, esterified carboxyl groups, and the like.

An illustrative example of the invention is the reaction of benzalbutylamine with benzoyl cyanide, which is represented by the following formulae:

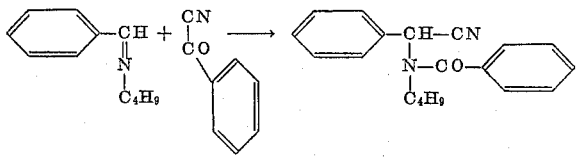

A preferred mode of procedure comprises reacting the α-keto-nitrile with the imine, Schiff base or hydrazone in the presence of small amounts of a basic catalyst, such as organic tertiary bases, e. g. trimethylamine, triethylamine, dimethylaniline, 1-methyl-piperidine. It is advantageous to perform the reaction at room temperature in a suitable medium, such as an organic solvent, e. g. ether, chloroform, benzene, alcohol, dioxane.

The yields obtained by the process of the invention are excellent ones and range up to nearly 100%.

The α-acylamino-nitriles produced by the process of the invention are crystallized compounds which are very well suited for being converted into α-amino-carboxylic acids by hydrolysis of the cyano group and of the acylamino group.

Example 1

25 g. of benzophenonimine and 18 g. of benzoyl cyanide are dissolved in 150 cc. of ether. A few drops of trimethylamine are added. After one hour's standing the ether is distilled off. The residue which crystallizes spontaneously is washed with some ether and recrystallized in butanol, 40 g. of α,α-diphenyl-α-benzoylamino-acetonitrile of melting point 199° are obtained.

Example 2

16 g. of benzalbutylamine and 13 g. of benzoyl cyanide are dissolved in 100 cc. of ether and 20 drops of trimethylamine are added. The mixture is kept overnight in a closed vessel. After distilling off the ether there remains an oily residue which soon crystallizes. Recrystallizing in methanol yields 21 g. of α-phenyl-α-(N-benzoyl-N-butyl-amino)-acetonitrile of melting point 99°.

Example 3

7 g. of the phenylhydrazone of acetone and 6.5 g. of benzoyl cyanide are dissolved in 40 cc. of ether. 10 drops of trimethyl-amine are added whereupon the mixture is kept standing overnight. The ether is evaporated off and the white crystals remaining back are recrystallized in butanol. 8 g. of α-(β-phenyl-α-benzoyl-hydrazino)-isobutyronitrile of melting point 168° are obtained.

Example 4

18 g. of benzalaniline and 7 g. of acetyl cyanide are dissolved in 150 cc. of ether and the solution kept standing at room temperature for about 12 hours. The ether is distilled off and the residue crystaillized from methanol. 20.5 g. of α-acetylanilino-α-phenyl-acetonitrile of melting point 114° are obtained.

Example 5

1.3 g. of propionphenonimine and 1.3 g. of benzoyl cyanide are dissolved in 10 cc. of ether and the mixture is kept standing overnight. After having evaporated off the solvent, the remaining oil soon crystallizes. The crystals are recrystallized in butanol and melt at 183°. Yield 0.7 g. of α-benzylamino-α-phenyl-butyronitrile.

Example 6

1.79 g. of fluorenonimine and 1.3 g. of benzoyl cyanide are dissolved in 10 cc. of ether and the mixture is kept standing two days at room temperature. The residue obtained after having evaporated off the ether consists of 9-benzoylamino-9-cyano-fluorene of melting point 227° which are purified by recrystallizing in butanol.

Example 7

1.29 g. of β-amino-crotonic acid ethyl ester and 1.3 g. of benzoylcyanide are dissolved in 10 cc. of ether and then kept standing overnight at room temperature. The ether is evaporated off whereupon the remaining oil slowly crystallizes. The β-benzoyl-amino-β-cyano-butyric acid ethyl ester formed is recrystallized in butanol; colorless leaflets of melting point 196°.

Example 8

1.79 g. of cyclohexylidene-cyclohexylamine and 1.3 g. of benzoyl cyanide are dissolved in 10 cc. of ether and kept standing overnight. The crystals of 1-(N-cyclohexyl-N-benzoylamino)-1-cyano-cyclohexane formed are sucked off and recrystallized in methanol. Melting point 189°. Yield 2.1 g.

Example 9

17 g. of furfurylidene-aniline and 13 g. of benzoyl cyanide are dissolved in 100 cc. of ether and the mixture is kept standing overnight in dry atmosphere. The oil remaining back after having evaporated off the ether soon crystallizes. The (N-benzoyl-anilino)-furyl-acetonitrile formed is purified by recrystallizing in methanol. Yield 19 g. Melting point 162°.

We claim:

1. A process which comprises reacting an aromatic ketone imine with an α-keto-nitrile selected from the group consisting of lower alkanoyl cyanides and aryloyl cyanides.

2. The process of claim 1, wherein the imine is propiophenone imine and the α-keto-nitrile is benzoyl cyanide.

3. The process of claim 1, wherein the imine is fluorenone imine and the α-keto-nitrile is benzoyl cyanide.

4. A process as in claim 1, wherein the imine is benzophenone imine and the α-keto-nitrile is benzoyl cyanide.

5. A process which comprises reacting the Schiff base of a primary aliphatic amine and an aromatic aldehyde with an α-keto-nitrile selected from the group consisting of lower alkanoyl cyanides and aryloyl cyanides.

6. The process of claim 5, wherein the Schiff base is benzal-butylamine and the α-keto-nitrile is benzoyl cyanide.

7. A process which comprises reacting the imine of a carbalkoxy substituted aliphatic ketone with an α-keto-nitrile selected from the group consisting of lower alkanoyl cyanides and aryloyl cyanides.

8. The process of claim 7, wherein the imine is that of a crotonic acid lower alkyl ester and the α-keto-nitrile is benzoyl cyanide.

No references cited.